(12) United States Patent
Kawahara

(10) Patent No.: US 11,535,094 B2
(45) Date of Patent: Dec. 27, 2022

(54) DRIVE UNIT

(71) Applicant: EXEDY Corporation, Neyagawa (JP)

(72) Inventor: Yuki Kawahara, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 0 days.

(21) Appl. No.: 17/683,903

(22) Filed: Mar. 1, 2022

(65) Prior Publication Data

US 2022/0314767 A1    Oct. 6, 2022

(30) Foreign Application Priority Data

Apr. 1, 2021 (JP) .............................. JP2021-062688

(51) Int. Cl.
| | |
|---|---|
| *F16H 47/08* | (2006.01) |
| *B60K 1/00* | (2006.01) |
| *B60K 17/04* | (2006.01) |
| *B60K 17/16* | (2006.01) |
| *B60K 17/08* | (2006.01) |

(52) U.S. Cl.
CPC .............. *B60K 1/00* (2013.01); *B60K 17/043* (2013.01); *F16H 47/08* (2013.01); *B60K 17/08* (2013.01); *B60K 17/165* (2013.01); *B60K 2001/001* (2013.01)

(58) Field of Classification Search
CPC .. B60K 1/00; B60K 17/043; B60K 2001/001; F16H 47/08
See application file for complete search history.

(56) References Cited

U.S. PATENT DOCUMENTS

| | | | | |
|---|---|---|---|---|
| 3,334,702 A | * | 8/1967 | Granryd | ................... E02F 3/84 180/243 |
| 7,247,117 B2 | * | 7/2007 | Forster | ................... B60K 17/14 475/221 |

FOREIGN PATENT DOCUMENTS

| | | | | |
|---|---|---|---|---|
| DE | 102004026040 A1 | * | 12/2005 | ............. B60K 25/00 |
| DE | 102019103242 A1 | * | 8/2020 | |
| DE | 102019111810 A1 | * | 11/2020 | |
| DE | 102019111811 A1 | * | 11/2020 | |
| JP | 2011-205831 A | | 10/2011 | |
| WO | WO-2016032390 A1 | * | 3/2016 | ............. B60K 17/16 |

\* cited by examiner

*Primary Examiner* — Sherry L Estremsky
(74) *Attorney, Agent, or Firm* — United IP Counselors, LLC

(57) ABSTRACT

A drive unit includes a rotary electric machine, a first fluid coupling, and a differential device. The first fluid coupling is configured to transmit a power outputted from the rotary electric machine through a hydraulic fluid. The differential device is disposed coaxial with the first fluid coupling. The differential device is configured to cause differential rotation of a pair of drive wheels.

15 Claims, 10 Drawing Sheets

DRIVE UNIT

CROSS-REFERENCE TO RELATED APPLICATIONS

This application claims priority to Japanese Patent Application No. 2021-062688 filed Apr. 1, 2021. The entire contents of that application are incorporated by reference herein in their entirety.

TECHNICAL FIELD

The present invention relates to a drive unit.

BACKGROUND ART

In recent years, there have been proposed electric cars equipped with a torque converter. For example, a drive unit for an electric car, described in Japan Laid-open Patent Application Publication No. 2011-205831, includes an electric motor, a torque converter, and a differential gear. Power, outputted from the electric motor, is amplified in torque by the torque converter. Then, the power, amplified in torque by the torque converter, is transmitted to respective drive wheels through the differential gear.

It has been demanded to make compact such a drive unit as described above. In view of this, it is an object of the present invention to provide a drive unit that can be made compact.

BRIEF SUMMARY

A drive unit according to an aspect of the present invention is configured to drive and rotate a pair of drive wheels. The drive unit includes a rotary electric machine, a first fluid coupling, and a differential device. The fluid coupling is configured to transmit a power outputted from the rotary electric machine through a hydraulic fluid. The differential device is disposed coaxial with the first fluid coupling. The differential device is configured to cause differential rotation of the pair of drive wheels.

According to this configuration, the first fluid coupling and the differential device are disposed coaxial with each other, whereby the drive unit can be made compact.

Preferably, the rotary electric machine is disposed coaxial with both the first fluid coupling and the differential device.

Preferably, the drive unit further includes either a reducer or a transmission. The reducer is configured to reduce a speed of the power outputted from the rotary electric machine. The transmission is configured to change the speed of the power outputted from the rotary electric machine.

Preferably, either the reducer or the transmission is disposed coaxial with both the first fluid coupling and the differential device.

Preferably, either the reducer or the transmission is disposed between the rotary electric machine and the first fluid coupling in a power transmission path.

Preferably, either the reducer or the transmission is disposed between the first fluid coupling and the differential device in the power transmission path.

Preferably, the drive unit further includes a forward/rearward traveling switching device. The forward/rearward traveling switching device is configured to switch a rotational direction of the power outputted from the rotary electric machine.

Preferably, the forward/rearward traveling switching device is disposed coaxial with both the first fluid coupling and the differential device.

Preferably, the forward/rearward traveling switching device is disposed between the first fluid coupling and the differential device in the power transmission path.

Preferably, the differential device is disposed axially between the rotary electric machine and the first fluid coupling.

Preferably, the rotary electric machine is disposed radially outside the first fluid coupling.

Preferably, the rotary electric machine is disposed radially outside the differential device.

Preferably, the drive unit further includes a countershaft. The countershaft is disposed non-coaxial with both the first fluid coupling and the differential device. The countershaft is disposed between the first fluid coupling and the differential device in the power transmission path.

Preferably, the countershaft is configured to reduce or change a speed of the power outputted from the first fluid coupling and transmit the power reduced or changed in speed to the differential device.

Preferably, the rotary electric machine is disposed non-coaxial with the first fluid coupling.

Preferably, either the reducer or the transmission is disposed coaxial with the rotary electric machine.

Preferably, the drive unit further includes a second fluid coupling. The second fluid coupling is disposed coaxial with both the first fluid coupling and the differential device. The first fluid coupling is configured to transmit the power outputted from the differential device to a first drive wheel through the hydraulic fluid. The second fluid coupling is configured to transmit the power outputted from the differential device to a second drive wheel through the hydraulic fluid.

Overall, according to the present invention, the drive unit can be made compact.

DETAILED DESCRIPTION

A drive unit according to the present preferred embodiment will be hereinafter explained with reference to drawings. It should be noted that in the following explanation, the term "axial direction" refers to an extending direction of a rotational axis O of a differential gear 4. Besides, the term "radial direction" refers to a radial direction of an imaginary circle about the rotational axis O.

<Drive Unit 100>

Figure 1:
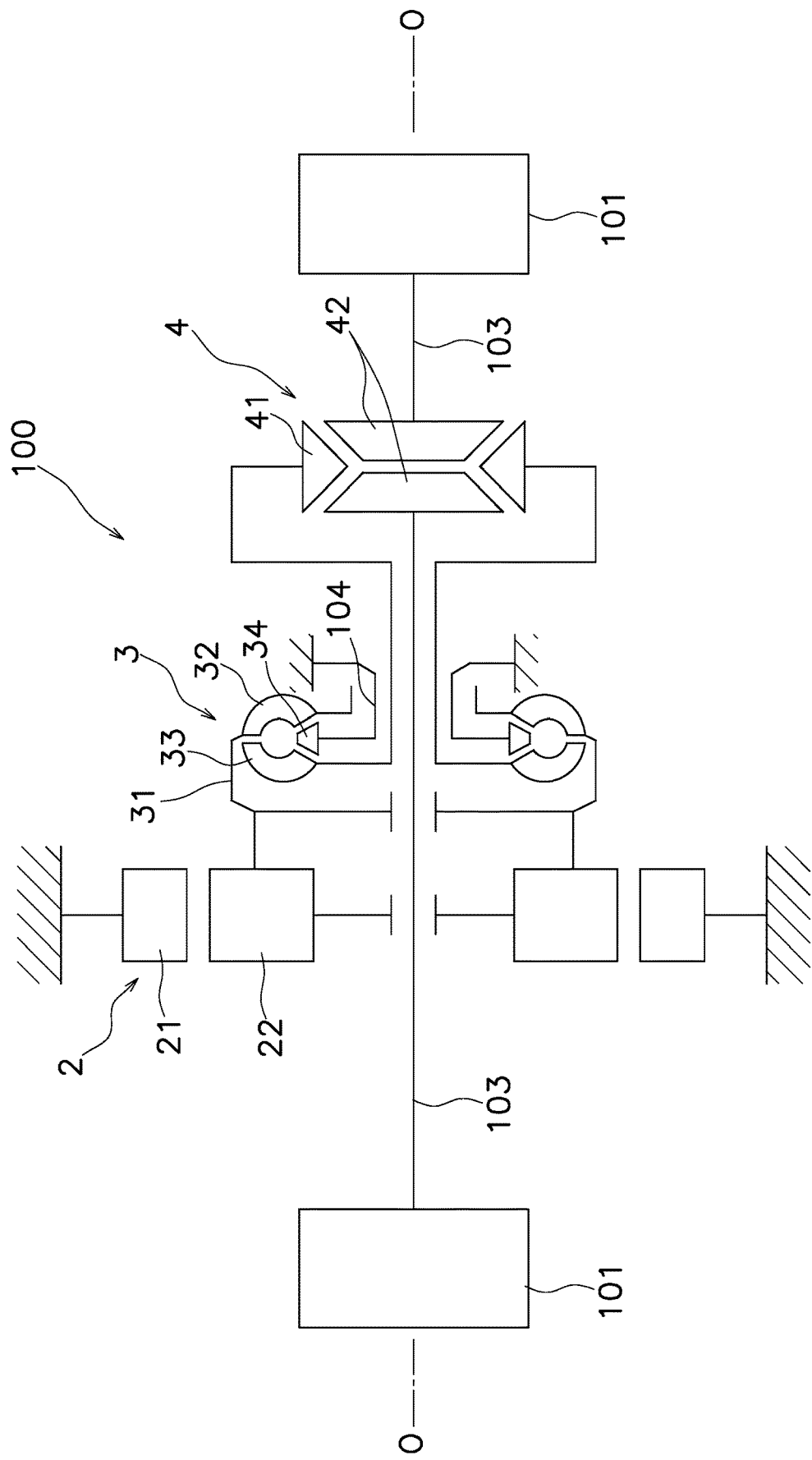
FIG. 1 is a schematic diagram of a drive unit according to the present preferred embodiment.

As shown in FIG. 1, a drive unit 100 includes an electric motor 2 (exemplary rotary electric machine), a first torque converter 3 (exemplary first fluid coupling), and a differential gear 4 (exemplary differential device). The first torque converter 3 is disposed axially between the electric motor 2 and the differential gear 4. In other words, the electric motor 2, the first torque converter 3, and the differential gear 4 are axially disposed in this order.

The drive unit 100 is installed in an electric car. It should be noted that the drive unit 100 may be installed in a hybrid car. The drive unit 100 is configured to drive and rotate a pair of drive wheels 101.

<Electric Motor 2>

The electric motor 2 includes a first stator 21 and a rotor 22. The first stator 21 is fixed to a frame, a housing, or so forth. The first stator 21 is non-rotatable.

The rotor 22 is rotatable about the rotational axis O. The rotor 22 is disposed radially inside the first stator 21. In other words, the electric motor 2 is of an inner rotor type. It should be noted that the electric motor 2 may be of an outer rotor type. It should be noted that the rotor 22 is rotatable relative to a pair of driveshafts 103.

The electric motor 2 is disposed coaxial with the differential gear 4. In other words, the rotational axis of the electric motor 2 is arranged to be substantially matched with the rotational axis O of the differential gear 4. It should be noted that the rotational axis of the electric motor 2 refers to that of the rotor 22.

<First Torque Converter 3>

The first torque converter 3 is configured to transmit power, outputted from the electric motor 2, through hydraulic fluid (e.g., hydraulic oil). The first torque converter 3 is disposed coaxial with the differential gear 4. In other words, the rotational axis of the first torque converter 3 is arranged to be substantially matched with the rotational axis O of the differential gear 4. The first torque converter 3 is rotatable relative to the pair of driveshafts 103.

The first torque converter 3 includes a cover 31, an impeller 32, a turbine 33, and a second stator 34.

The cover 31 is a component to which the power, outputted from the electric motor 2, is transmitted. The cover 31 is attached to the rotor 22 of the electric motor 2. The cover 31 is unitarily rotated with the rotor 22 of the electric motor 2. It should be noted that another member may be interposed between the cover 31 and the rotor 22. Besides, the cover 31 may be rotated at different speed from the rotor 22.

The impeller 32 is fixed to the cover 31. The impeller 32 is unitarily rotated with the cover 31.

The turbine 33 is disposed opposite to the impeller 32. The turbine 33 is a component to which the power is transmitted from the impeller 32 through the hydraulic fluid.

The second stator 34 is disposed between the impeller 32 and the turbine 33. The second stator 34 is attached to a stationary shaft 104 through a one-way clutch (not shown in the drawings).

<Differential Gear 4>

The differential gear 4 is a component to which the power is transmitted from the first torque converter 3. In other words, the electric motor 2, the first torque converter 3, and the differential gear 4 are disposed in this order in a power transmission path.

The differential gear 4 is configured to transmit the power transmitted thereto from the first torque converter 3 such that the power is distributed to the two drive wheels 101. The differential gear 4 is configured to enable differential rotation of the pair of drive wheels 101. When described in detail, the differential gear 4 is configured to enable differential rotation of the pair of driveshafts 103.

The differential gear 4 is disposed coaxial with the first torque converter 3. In other words, the rotational axis O of the differential gear 4 is arranged to be substantially matched with the rotational axis of the first torque converter 3.

The differential gear 4 includes a pinion gear 41 and a pair of side gears 42. The pinion gear 41 is a component to which the power is transmitted from the turbine 33. The rotational axis of the pinion gear 41 extends in a radial direction. Besides, the pinion gear 41 is disposed to rotate about the rotational axis thereof and revolve about the rotational axis O.

Each side gear 42 is meshed with the pinion gear 41. Each side gear 42 transmits the power, transmitted thereto from the pinion gear 41, to corresponding one of the pair of driveshafts 103.

[Modifications]

One preferred embodiment of the present invention has been explained above. However, the present invention is not limited to the above, and a variety of changes can be made without departing from the gist of the present invention.

Modification 1

Figure 2:
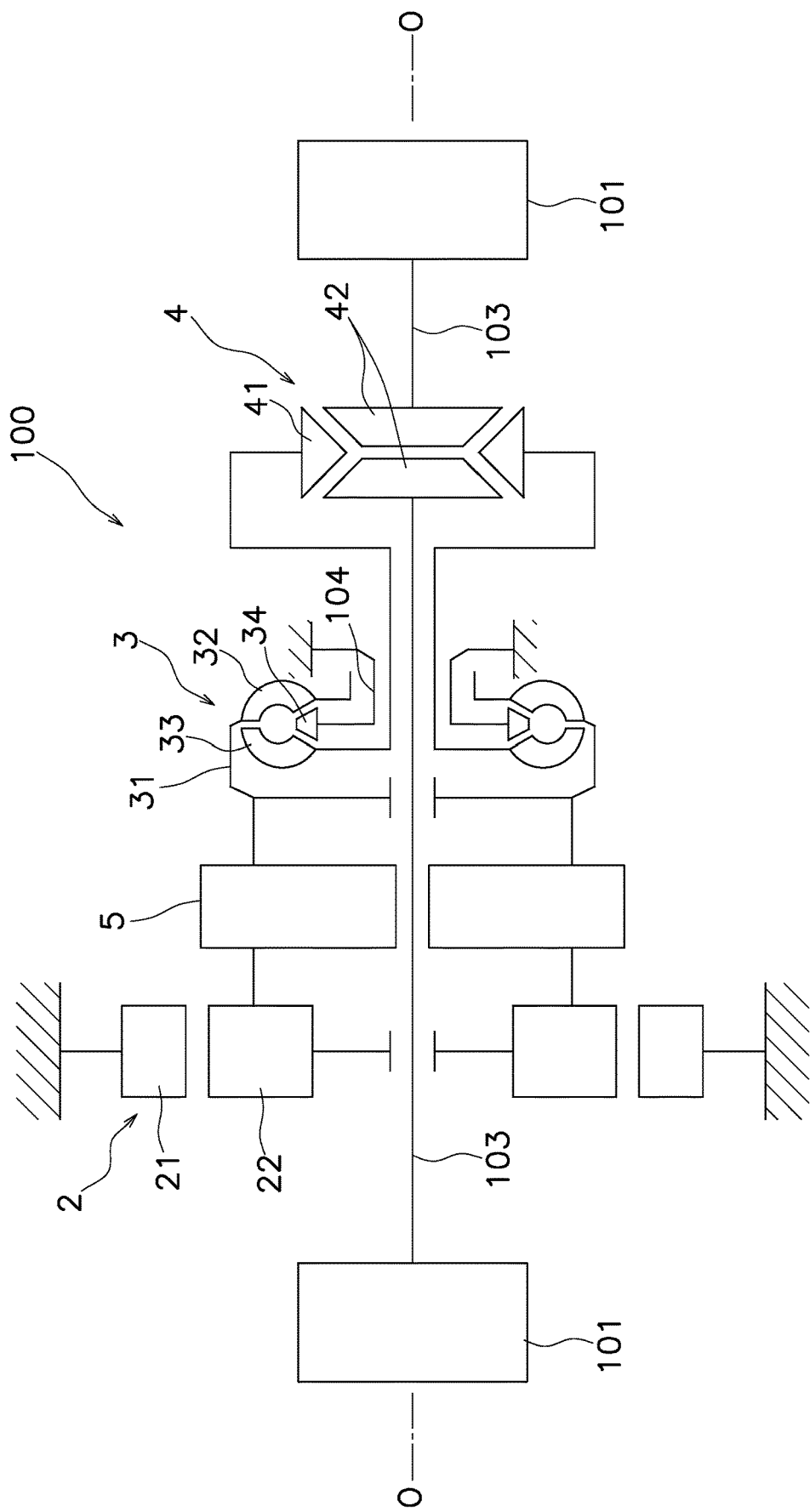
FIG. 2 is a schematic diagram of a drive unit according to a modification.

As shown in FIG. 2, the drive unit 100 may further include a reducer 5. The reducer 5 is disposed coaxial with the first torque converter 3 and the differential gear 4. Besides, the reducer 5 is disposed coaxial with the electric motor 2 as well. It should be noted that the reducer 5 is composed of, for instance, a plurality of gears and so forth.

The reducer 5 is disposed between the electric motor 2 and the first torque converter 3 in the power transmission path. In other words, the reducer 5 reduces the speed of the power outputted thereto from the electric motor 2 and outputs the power reduced in speed to the first torque converter 3.

The reducer 5 is disposed axially between the electric motor 2 and the first torque converter 3. In other words, the electric motor 2, the reducer 5, and the first torque converter 3 are axially disposed in this order. When described in detail, the electric motor 2, the reducer 5, the first torque converter 3, and the differential gear 4 are axially disposed in this order.

Figure 3:
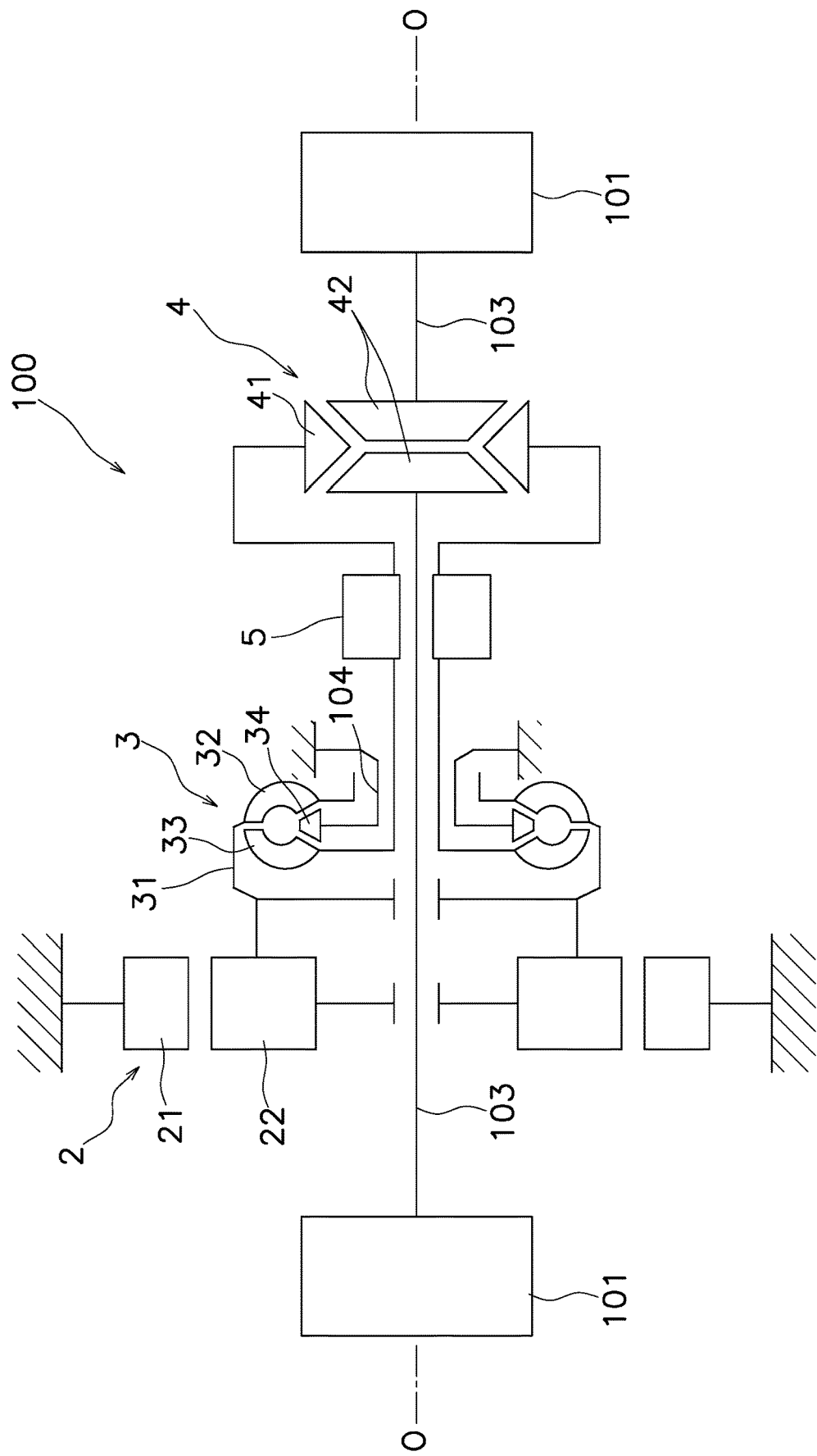
FIG. 3 is a schematic diagram of a drive unit according to the modification.

As shown in FIG. 3, the reducer 5 may be disposed between the first torque converter 3 and the differential gear 4 in the power transmission path. In other words, the reducer 5 may reduce the speed of the power transmitted thereto from the first torque converter 3 and output the power reduced in speed to the differential gear 4.

The reducer 5 is disposed axially between the first torque converter 3 and the differential gear 4. In other words, the first torque converter 3, the reducer 5, and the differential gear 4 are axially disposed in this order. When described in detail, the electric motor 2, the first torque converter 3, the reducer 5, and the differential gear 4 are axially disposed in this order.

In each configuration of the modification described above, the drive unit 100 may include a transmission, or alternatively, a forward/rearward traveling switching device instead of the reducer 5. It should be noted that the forward/rearward traveling switching device is configured to switch the rotational direction of the power outputted from the electric motor 2. The forward/rearward traveling switching device is composed of a plurality of gears.

The forward/rearward traveling switching device is preferably disposed between the first torque converter 3 and the differential gear 4 in the power transmission path. In other words, the forward/rearward traveling switching device is configured to switch the rotational direction of the power outputted from the first torque converter 3. According to the configuration, the rotational direction of the power inputted to the first torque converter 3 can be set identical between in forward traveling and in rearward traveling.

Modification 2

Figure 4:
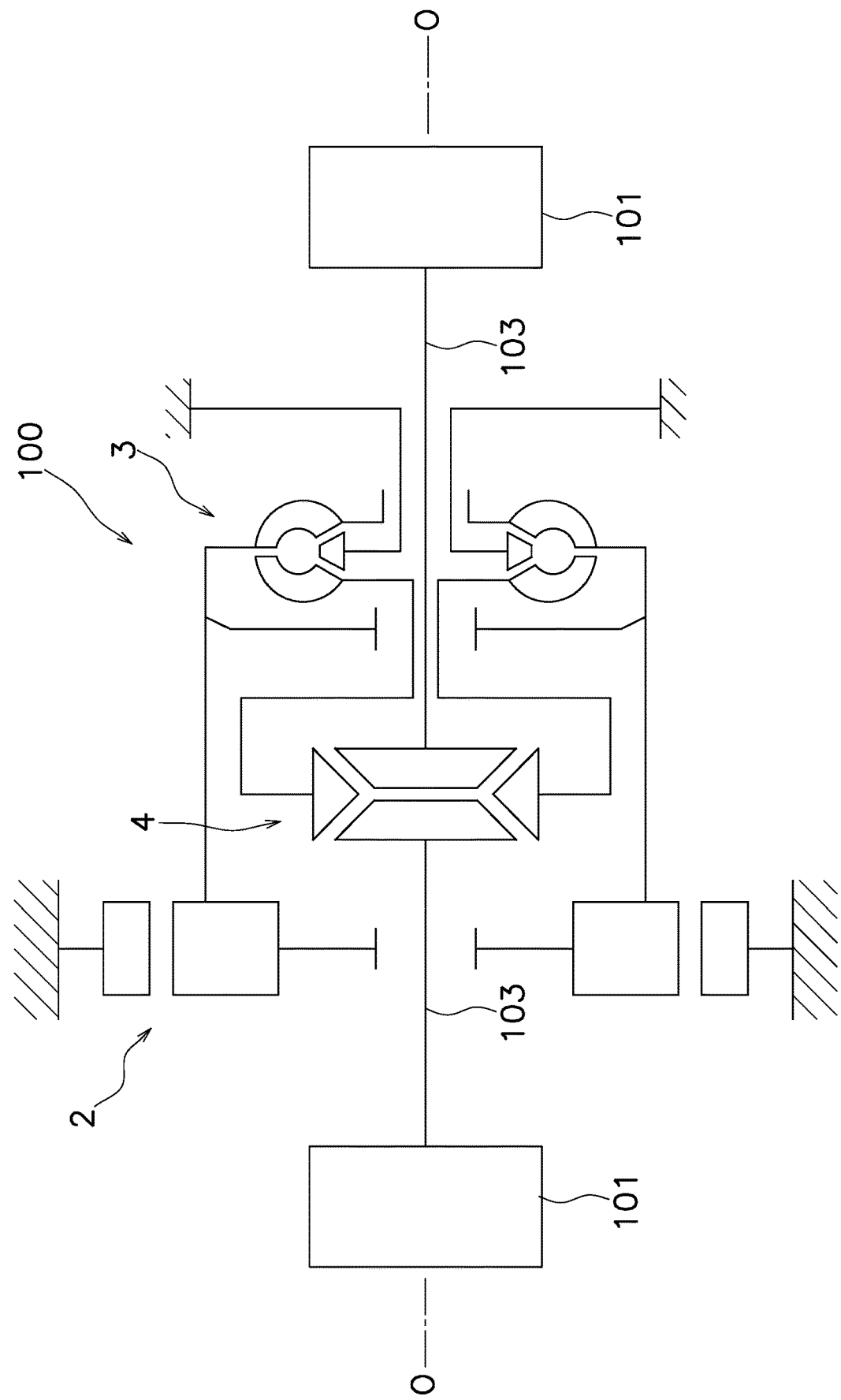
FIG. 4 is a schematic diagram of a drive unit according to another modification.

As shown in FIG. 4, the differential gear 4 may be disposed axially between the electric motor 2 and the first torque converter 3. In other words, the electric motor 2, the differential gear 4, and the first torque converter 3 are axially disposed in this order. It should be noted that the power transmission path passes through the electric motor 2, the first torque converter 3, and the differential gear 4 in this order.

Modification 3

Figure 5:
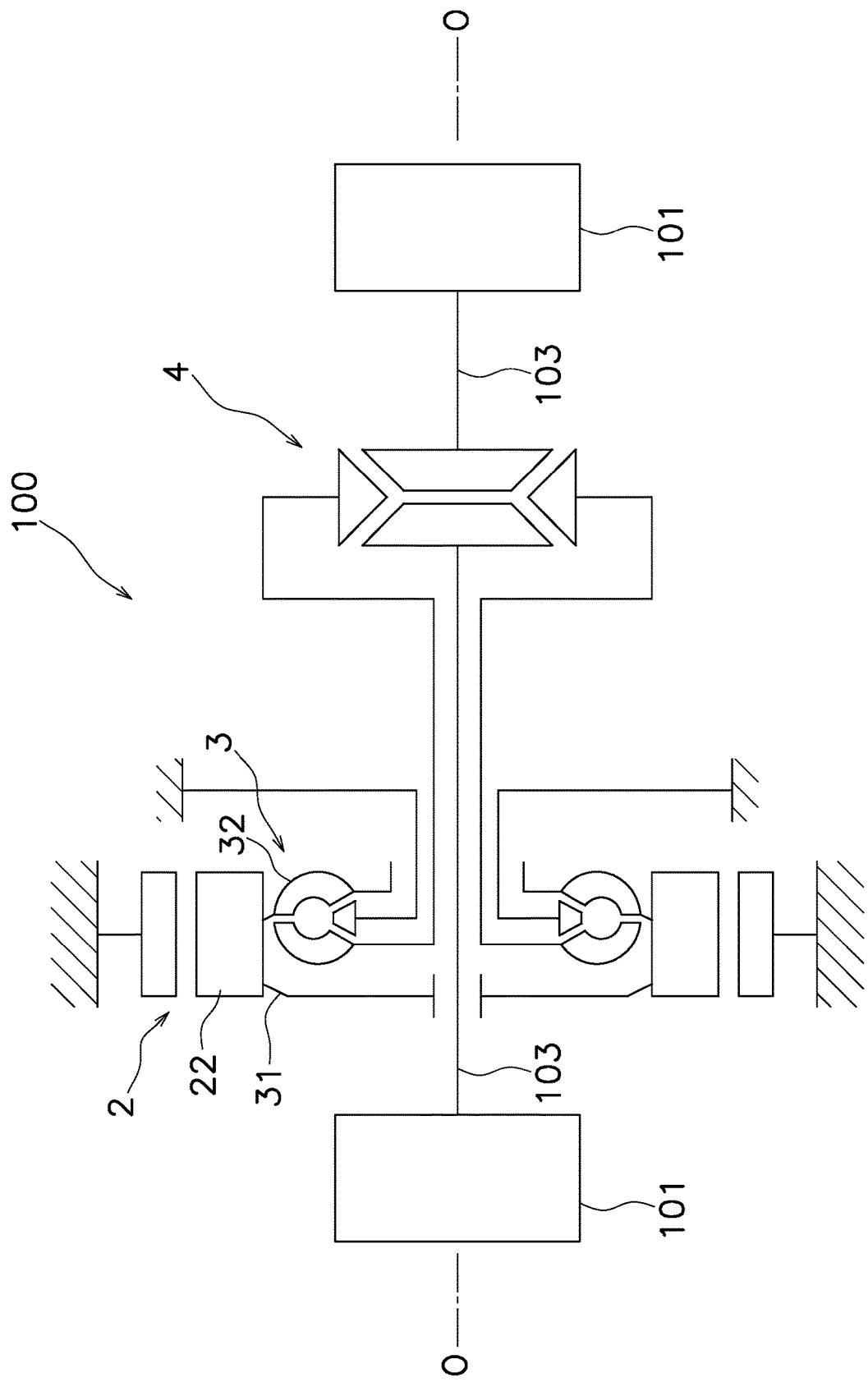
FIG. 5 is a schematic diagram of a drive unit according to yet another modification.

As shown in FIG. 5, the electric motor 2 may be disposed radially outside the first torque converter 3. In other words, the electric motor 2 may overlap the first torque converter 3 in a radial view. The electric motor 2 and the first torque converter 3 are identical to each other in axial position.

The electric motor 2 is disposed to enclose the first torque converter 3. The electric motor 2 is attached to the outer peripheral surface of the first torque converter 3. When described in detail, the rotor 22 of the electric motor 2 is attached to the outer peripheral surface of either the cover 31 or the impeller 32 of the first torque converter 3. It should be noted that another member may be interposed between the rotor 22 and either the cover 31 or the impeller 32.

Modification 4

Figure 6:
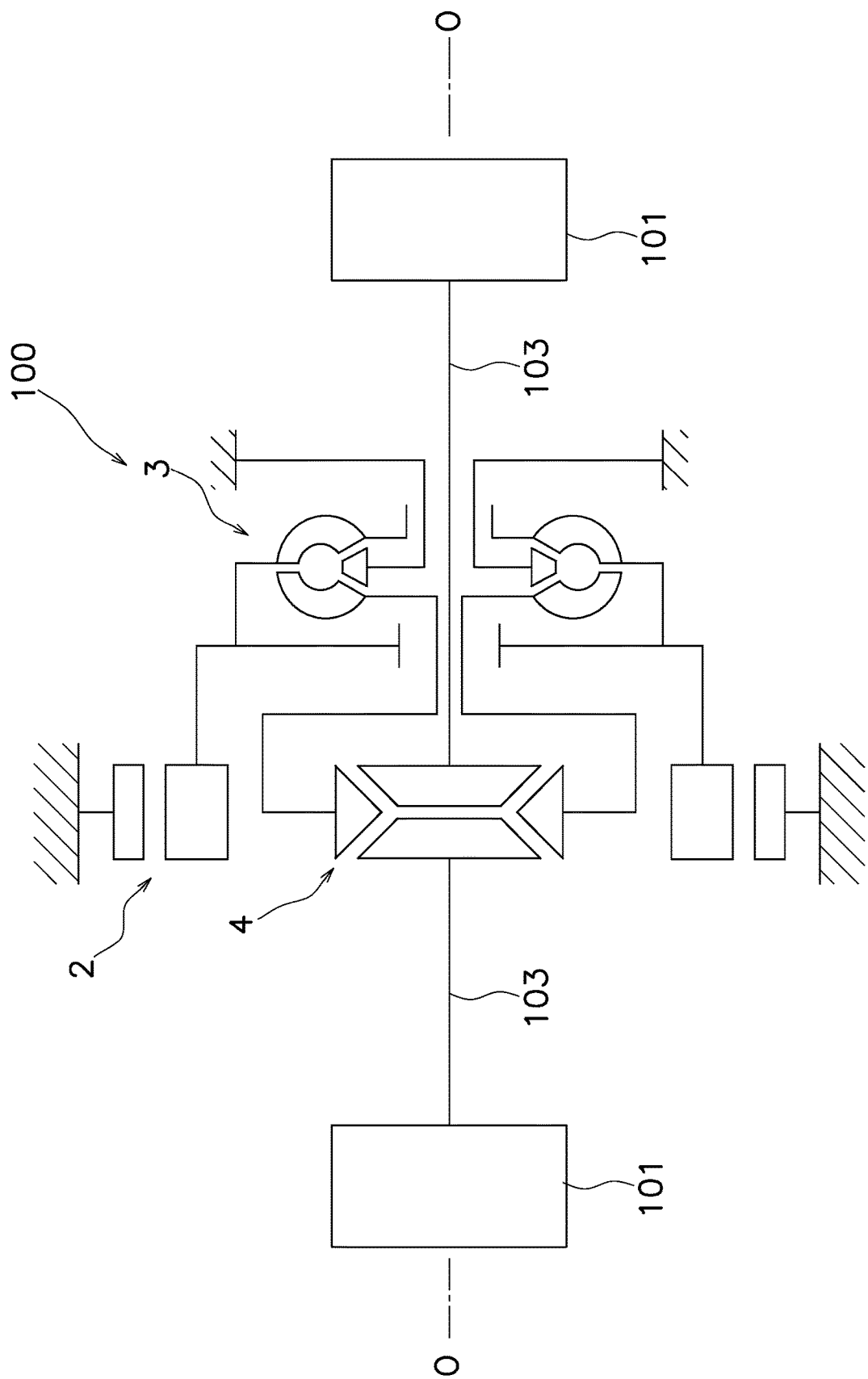
FIG. 6 is a schematic diagram of a drive unit according to still yet another modification.

As shown in FIG. 6, the electric motor 2 may be disposed radially outside the differential gear 4. In other words, the electric motor 2 may overlap the differential gear 4 in a radial view. The electric motor 2 and the differential gear 4 are identical to each other in axial position.

The electric motor 2 is disposed to enclose the differential gear 4. It should be noted that the power transmission path passes through the electric motor 2, the first torque converter 3, and the differential gear 4 in this order.

Modification 5

Figure 7:
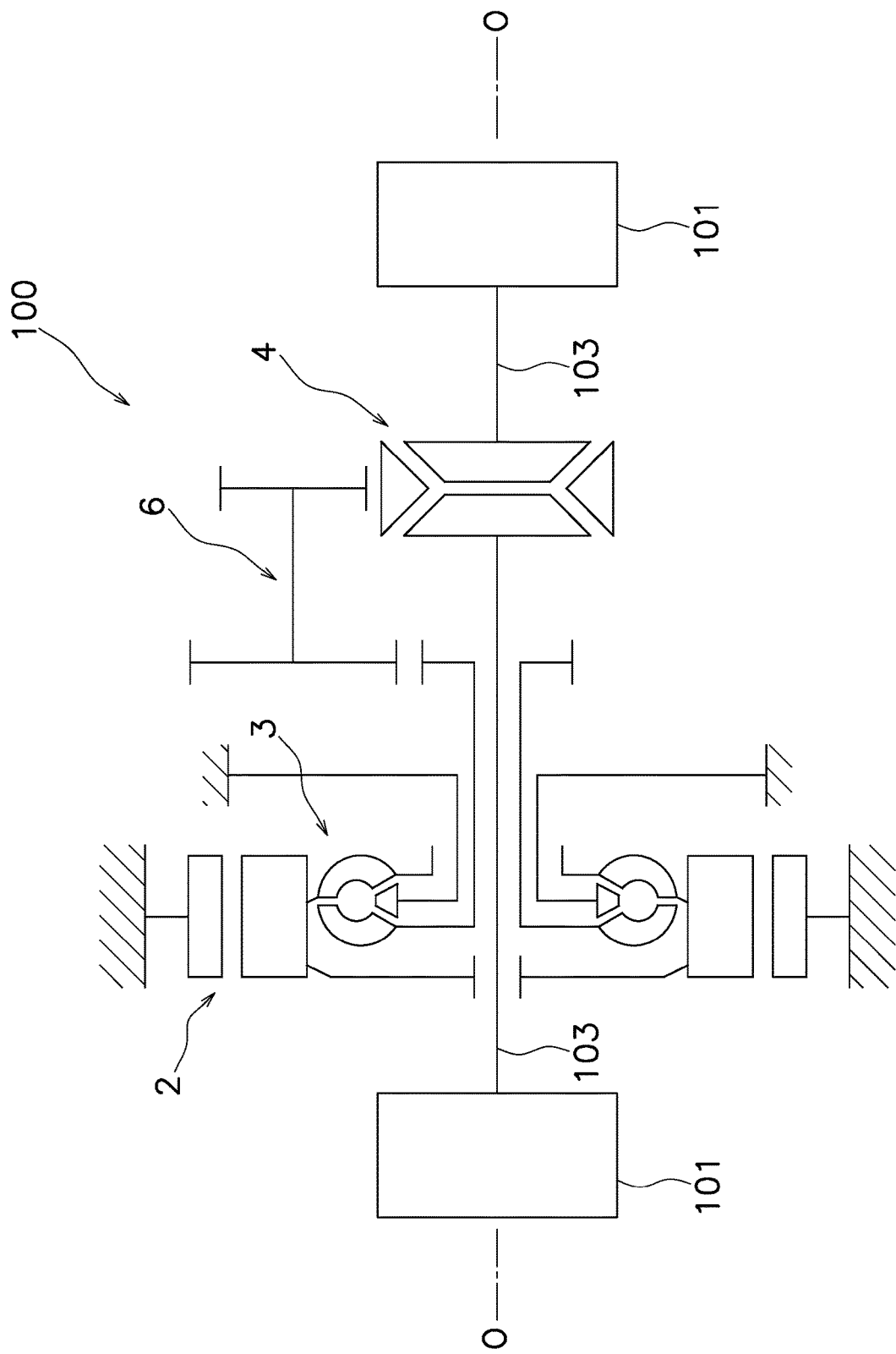
FIG. 7 is a schematic diagram of a drive unit according to a further modification.

As shown in FIG. 7, the drive unit 100 may further include a countershaft 6. The countershaft 6 is disposed non-coaxial with the first torque converter 3 and the differential gear 4. In other words, the rotational axis of the countershaft 6 is disposed not to be matched with the rotational axis O of both the first torque converter 3 and the differential gear 4. The rotational axis of the countershaft 6 extends substantially in parallel to the rotational axis O of both the first torque converter 3 and the differential gear 4.

The countershaft 6 is disposed between the first torque converter 3 and the differential gear 4 in the power transmission path. In other words, the first torque converter 3 transmits the power to the differential gear 4 through the countershaft 6.

The countershaft 6 is configured to reduce the speed of the power transmitted thereto from the first torque converter 3 and transmit the power reduced in speed to the differential gear 4. In other words, the countershaft 6 functions as a reducer. For example, the countershaft 6 includes a plurality of gears.

In this case, for instance, the differential gear 4 includes a ring gear (not shown in the drawing). Besides, one of the gears of the countershaft 6 rotates the ring gear of the differential gear 4, while being meshed therewith. In conjunction with the rotation of the ring gear, the pinion gear 41 revolves about the rotational axis O.

It should be noted that the countershaft 6 may be configured to change the speed of the power transmitted thereto from the first torque converter 3 and transmit the power changed in speed to the differential gear 4. In other words, the countershaft 6 may include a transmission.

Modification 6

Figure 8:
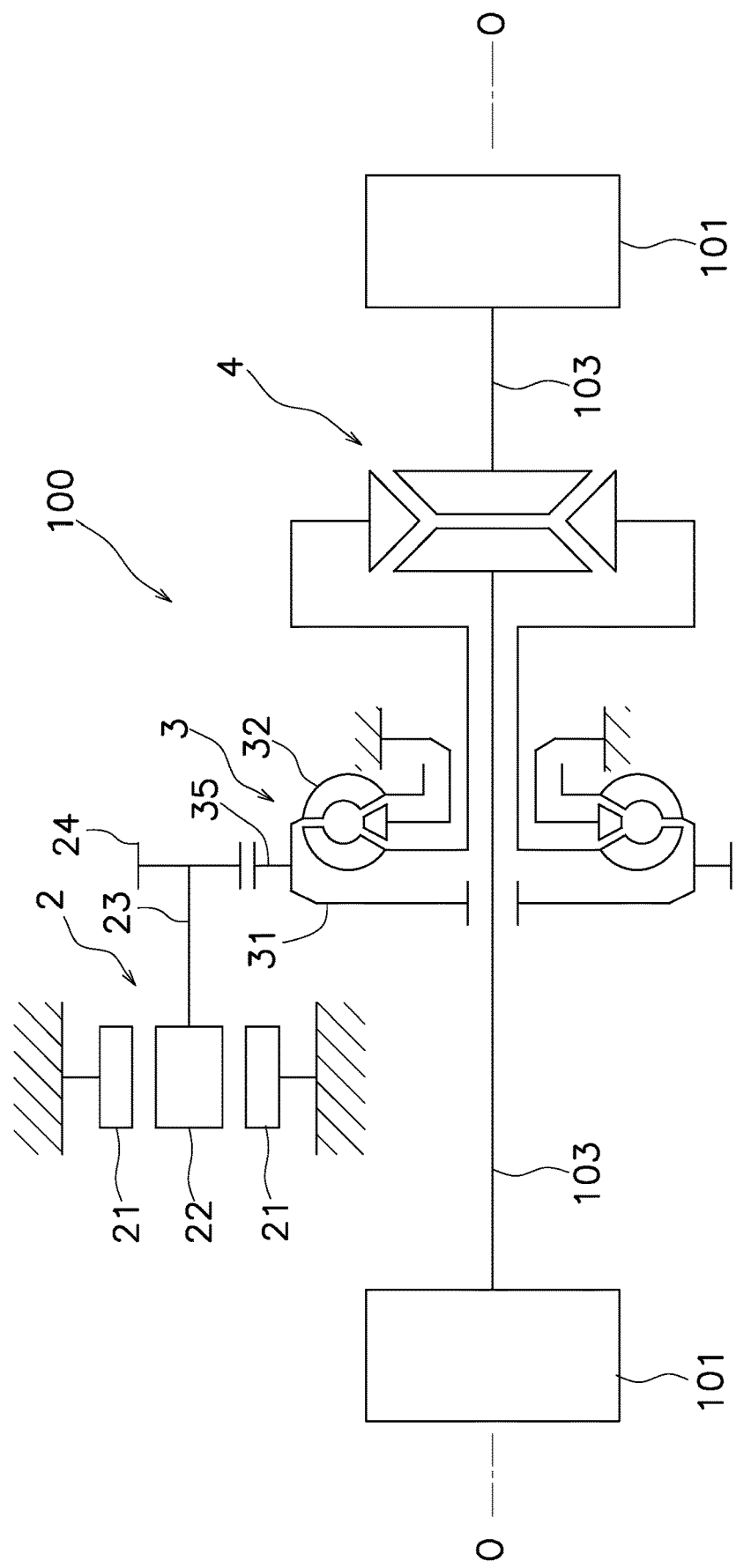
FIG. 8 is a schematic diagram of a drive unit according to a yet further modification.

As shown in FIG. 8, the electric motor 2 may be disposed non-coaxial with the first torque converter 3. In other words, the rotational axis of the electric motor 2 is disposed not to be matched with the rotational axis O of both the first torque converter 3 and the differential gear 4. The rotational axis of the electric motor 2 extends substantially in parallel to the rotational axis O of both the first torque converter 3 and the differential gear 4.

In this case, for instance, the power is transmitted from the electric motor 2 to the first torque converter 3 as follows. First, the electric motor 2 includes an output shaft 23 and a gear 24. The gear 24 is attached to the output shaft 23.

The first torque converter 3 includes a ring gear 35. For example, the cover 31 is provided with the ring gear 35, but alternatively, the impeller 32 or so forth may be provided with the ring gear 35. The ring gear 35 may be provided as a member separated from the cover 31, or alternatively, may be provided as a member integrated therewith. When the gear 24 of the electric motor 2 is meshed with the ring gear 35, the power is transmitted from the electric motor 2 to the first torque converter 3. It should be noted that another member may be interposed between the electric motor 2 and the first torque converter 3.

Figure 9:
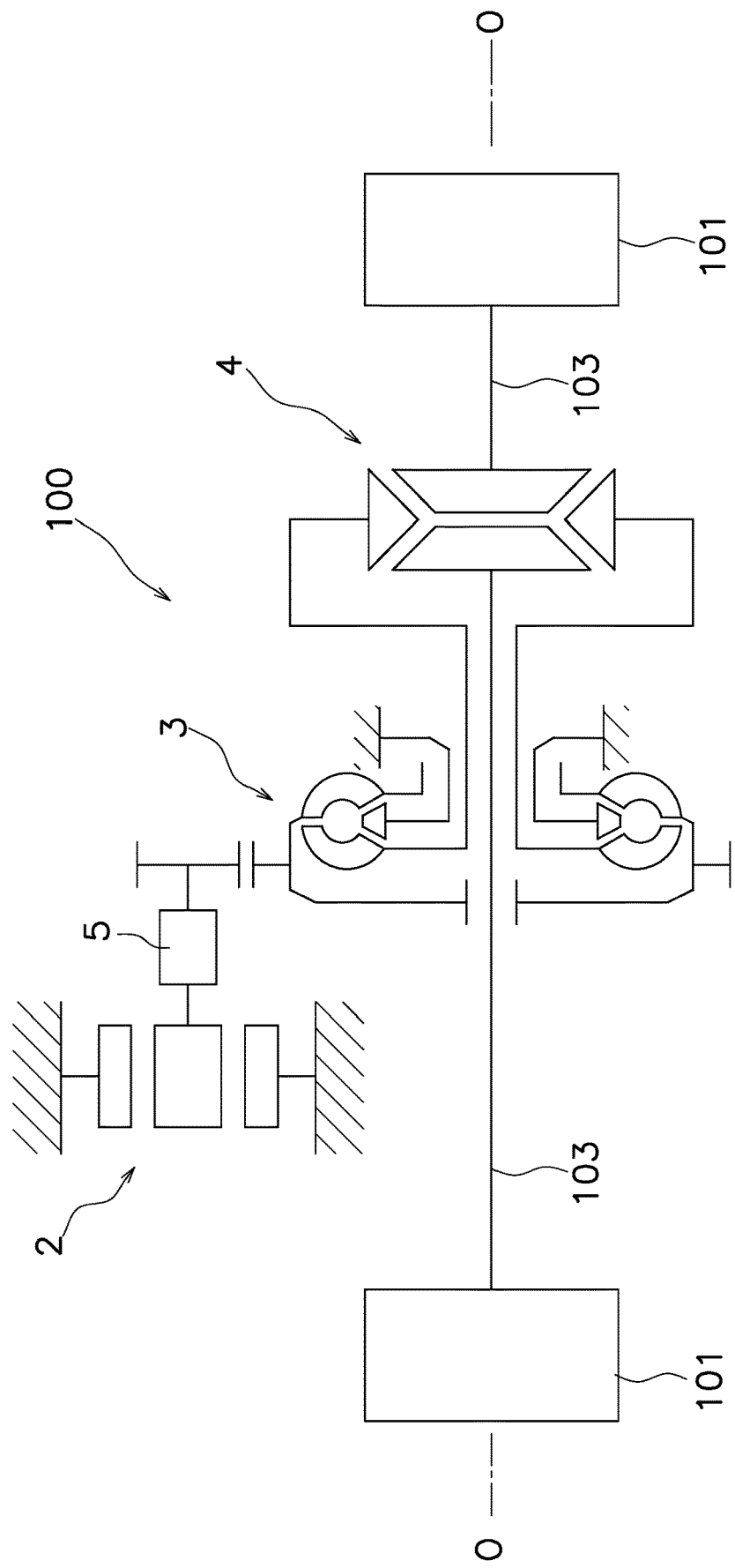
FIG. 9 is a schematic diagram of a drive unit according to the yet further modification.

In this modification, the reducer 5 may be disposed coaxial with the electric motor 2 as shown in FIG. 9. Alternatively, the reducer 5 may be disposed coaxial with the differential gear 4. It should be noted that a transmission may be installed instead of the reducer 5.

Modification 7

Figure 10:
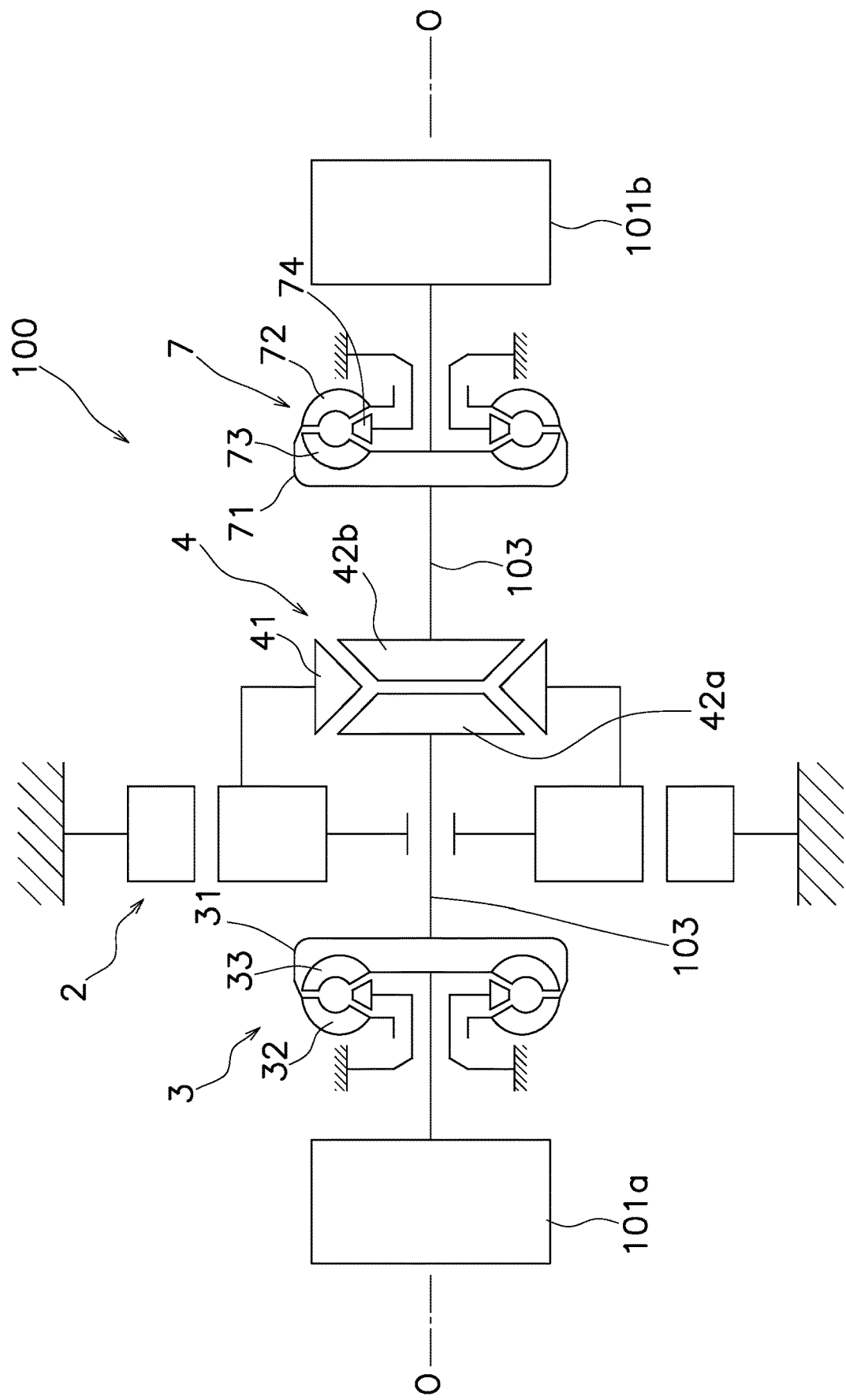
FIG. 10 is a schematic diagram of a drive unit according to a still yet further modification.

As shown in FIG. 10, the drive unit 100 may further include a second torque converter 7. The second torque converter 7 is disposed coaxial with the first torque converter 3 and the differential gear 4. In other words, the rotational axis of the second torque converter 7 is disposed to be substantially matched with the rotational axis O of both the first torque converter 3 and the differential gear 4.

In this modification, the torque converters 3 and 7 and the differential gear 4 are reversed in positional order in the power transmission path. In other words, the power transmission path passes through the electric motor 2, the differential gear 4, and the torque converters 3 and 7 in this order.

When described in detail, the first torque converter 3 is configured to transmit the power, outputted from the differential gear 4, to a first drive wheel 101a. In more detail, the power, outputted from a first side gear 42a of the differential gear 4, is transmitted to the cover 31 of the first torque converter 3.

The power, transmitted to the cover 31, is transmitted to the impeller 32, the hydraulic fluid, and the turbine 33 in this order. Then, the first torque converter 3 transmits the power from the turbine 33 to the first drive wheel 101a.

The second torque converter 7 is configured to transmit the power, outputted from the differential gear 4, to a second drive wheel 101b. When described in detail, the second torque converter 7 includes a cover 71, an impeller 72, a turbine 73, and a second stator 74. The power, outputted from a second side gear 42b of the differential gear 4, is transmitted to the cover 71 of the second torque converter 7.

The power, transmitted to the cover 71 of the second torque converter 7, is transmitted to the impeller 72, the hydraulic fluid, and the turbine 73 in this order. Then, the second torque converter 7 transmits the power from the turbine 73 to the second drive wheel 101b.

Modification 8

In the preferred embodiment described above, the differential gear 4 has been described as an exemplary differential device. However, the differential device is not limited to this. For example, the differential device may be a torque vectoring device.

REFERENCE SIGNS LIST

2: Electric motor
3: First torque converter
4: Differential gear
5: Reducer
6: Countershaft
7: Second torque converter
100: Drive unit
101: Drive wheel

What is claimed is:

1. A drive unit configured to drive and rotate a pair of drive wheels, the drive unit comprising:
   a rotary electric machine;
   a first fluid coupling configured to transmit a power outputted from the rotary electric machine through a hydraulic fluid;
   a differential device disposed coaxial with the first fluid coupling, the differential device configured to cause differential rotation of the pair of drive wheels; and
   either a reducer or a transmission, the reducer configured to reduce a speed of the power outputted from the rotary electric machine, the transmission configured to change the speed of the power outputted from the rotary electric machine,
   either the reducer or the transmission being disposed between the rotary electric machine and the first fluid coupling in a power transmission path.

2. The drive unit according to claim 1, wherein the rotary electric machine is disposed coaxial with both the first fluid coupling and the differential device.

3. The drive unit according to claim 1, wherein either the reducer or the transmission is disposed coaxial with both the first fluid coupling and the differential device.

4. The drive unit according to claim 1, wherein either the reducer or the transmission is disposed between the first fluid coupling and the differential device in a power transmission path.

5. The drive unit according to claim 1, wherein the differential device is disposed axially between the rotary electric machine and the first fluid coupling.

6. The drive unit according to claim 1, further comprising:
   a countershaft disposed non-coaxial with both the first fluid coupling and the differential device, wherein
   the countershaft is disposed between the first fluid coupling and the differential device in a power transmission path.

7. The drive unit according to claim 6, wherein the countershaft is configured to reduce or change a speed of the power outputted from the first fluid coupling and transmit the power reduced or changed in speed to the differential device.

8. The drive unit according to claim 1, wherein either the reducer or the transmission is disposed coaxial with the rotary electric machine.

9. A drive unit configured to drive and rotate a pair of drive wheels, the drive unit comprising:
   a rotary electric machine;
   a first fluid coupling configured to transmit a power outputted from the rotary electric machine through a hydraulic fluid;
   a differential device disposed coaxial with the first fluid coupling, the differential device configured to cause differential rotation of the pair of drive wheels; and
   a forward/rearward traveling switching device configured to switch a rotational direction of the power outputted from the rotary electric machine.

10. The drive unit according to claim 9, wherein the forward/rearward traveling switching device is disposed coaxial with both the first fluid coupling and the differential device.

11. The drive unit according to claim 9, wherein the forward/rearward traveling switching device is disposed between the first fluid coupling and the differential device in a power transmission path.

12. A drive unit configured to drive and rotate a pair of drive wheels, the drive unit comprising:
   a rotary electric machine;
   a first fluid coupling configured to transmit a power outputted from the rotary electric machine through a hydraulic fluid; and
   a differential device disposed coaxial with the first fluid coupling, the differential device configured to cause differential rotation of the pair of drive wheels,
   the rotary electric machine being disposed radially outside the first fluid coupling.

13. A drive unit configured to drive and rotate a pair of drive wheels, the drive unit comprising:
   a rotary electric machine;
   a first fluid coupling configured to transmit a power outputted from the rotary electric machine through a hydraulic fluid; and
   a differential device disposed coaxial with the first fluid coupling, the differential device configured to cause differential rotation of the pair of drive wheels,
   the rotary electric machine being disposed radially outside the differential device.

14. A drive unit configured to drive and rotate a pair of drive wheels, the drive unit comprising:
   a rotary electric machine;
   a first fluid coupling configured to transmit a power outputted from the rotary electric machine through a hydraulic fluid; and
   a differential device disposed coaxial with the first fluid coupling, the differential device configured to cause differential rotation of the pair of drive wheels,
   the rotary electric machine being disposed non-coaxial with the first fluid coupling.

15. A drive unit configured to drive and rotate a pair of drive wheels, the drive unit comprising:
   a rotary electric machine;
   a first fluid coupling configured to transmit a power outputted from the rotary electric machine through a hydraulic fluid;
   a differential device disposed coaxial with the first fluid coupling, the differential device configured to cause differential rotation of the pair of drive wheels; and
   a second fluid coupling disposed coaxial with both the first fluid coupling and the differential device,
   the pair of drive wheels including a first drive wheel and a second drive wheel, the first fluid coupling being further configured to transmit the power outputted from the differential device to the first drive wheel through the hydraulic fluid, and the second fluid coupling being configured to transmit the power outputted from the differential device to the second drive wheel through the hydraulic fluid.

\* \* \* \* \*